United States Patent [19]

Taylor, Jr. et al.

[11] Patent Number: 4,649,389

[45] Date of Patent: Mar. 10, 1987

[54] STACKED BEAM RADAR AND TARGET HEIGHT MEASUREMENT EXTRACTOR ESPECIALLY FOR USE THEREIN

[75] Inventors: John W. Taylor, Jr., Baltimore; Michael J. Hodges, Linthicum, both of Md.

[73] Assignee: Westinghouse Electric Corp., Pittsburgh, Pa.

[21] Appl. No.: 593,784

[22] Filed: Mar. 27, 1984

[51] Int. Cl.$^4$ .............................................. G01S 13/48
[52] U.S. Cl. ..................................... 342/123; 342/133
[58] Field of Search ............. 343/12 SB, 6 DF, 12 R, 343/7.3, 417, 423, 16 R, 11 R, 10

[56] References Cited

U.S. PATENT DOCUMENTS

| | | | |
|---|---|---|---|
| 3,170,156 | 2/1965 | Downs | 343/12 SB |
| 3,311,913 | 3/1967 | Varela | 343/12 SB |
| 3,955,195 | 5/1976 | Greene | 343/12 SB X |
| 4,117,538 | 9/1978 | Schrader et al. | 364/517 |
| 4,150,378 | 4/1979 | Barton | 343/16 M |
| 4,316,191 | 2/1982 | Sawatari et al. | 343/16 R |
| 4,342,997 | 8/1982 | Evans | 343/16 R |
| 4,538,150 | 8/1985 | Bone, Jr. | 343/12 SB X |

FOREIGN PATENT DOCUMENTS 1186194 8/1967 United Kingdom ........... 343/12 SB

Primary Examiner—T. H. Tubbesing
Assistant Examiner—John B. Satomayor
Attorney, Agent, or Firm—W. E. Zitelli

[57] ABSTRACT

A radar having a multiplicity of receive beams stacked in elevation and a target height extractor especially for use therein are disclosed. In operation, a set of range sweeps corresponding to an azimuth scan of the stacked receive beams across a detected target is established. A range cell interval corresponding to the detected target is estimated for each range sweep of the set. A target range measurement is computed from a set of estimated range intervals. Only the radar receive beam echo information corresponding to the estimated range cell interval for each range sweep of the established set is used by the height extractor to compute a corresponding set of elevation angles. A target elevation angle is formed as the weighted average of this computed set. Only one height computation is performed for each established set of range sweeps based on a function of factors including the computed target elevation angle and computed range measurement of the corresponding established set of range sweeps.

50 Claims, 19 Drawing Figures

BACKGROUND

FIG. 2 BACKGROUND

BACKGROUND

BACKGROUND

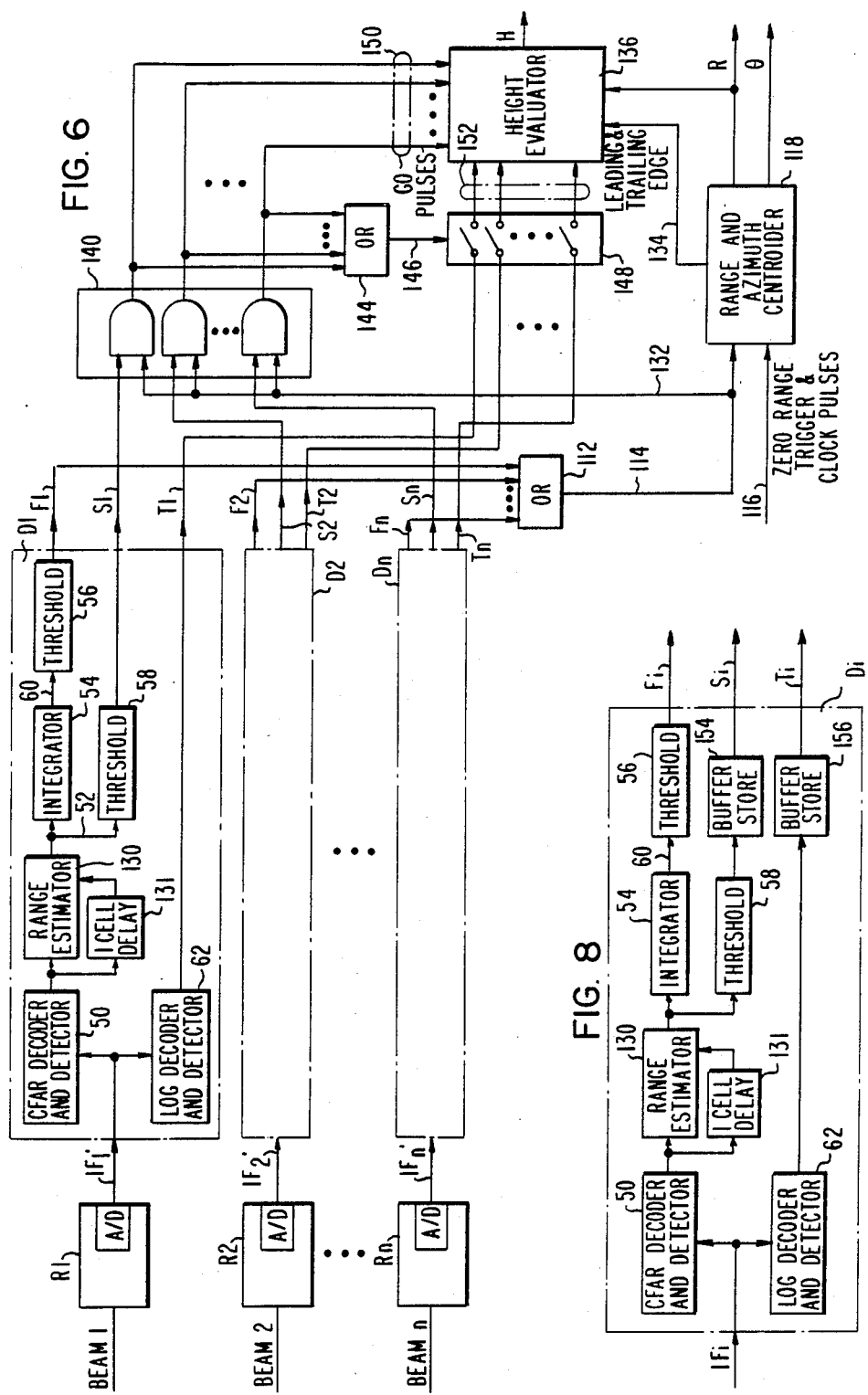

STACKED BEAM RADAR AND TARGET HEIGHT MEASUREMENT EXTRACTOR ESPECIALLY FOR USE THEREIN

BACKGROUND OF THE INVENTION

The present invention relates to radars in general, and more specifically, to a radar having a plurality of receive beams stacked in elevation and a target height measurement extractor especially for use therein.

Typical examples of stacked beam radars including a target height extractor include the AN/TPS-43 manufactured by the Westinghouse Electric Corporation and another similar radar, the Martello radar manufactured by Marconi. An illustrative sketch of a stacked beam radar being used in a typical environment is shown in FIG. 1. The stacked beam radar includes an antenna assembly 20 for generating a multiplicity of receive beams 22 stacked in elevation. A radar unit, denoted by the block 24, is coupled to the antenna system 20 for operation thereof. The radar unit 24 may include a transmitter 26 for driving the antenna assembly 20 to transmit radar pulses at a pulse repetition frequency (PRF) and with a desired elevation coverage to illuminate targets, such as that shown at 28, for example. The interpulse periods of the pulsed transmissions constitute range sweeps of the radar. The radar is further operative to scan the pulsed transmissions and associated receive beams 22 in azimuth. Further included in the radar is a multiplicity of echo conditioning or receiving channels 32 respectively corresponding to the multiplicity of receive beams 22. The receiving channels 32 listen simultaneously on all of the beams 22 for echoes, generally of the same frequency. Target information 34 derived from the receive beam echoes by the receiving channels 32 may be provided to a three-dimensional (3D) computer 36 which functions to compute the range R, height H and azimuth $\theta$ measurements of a detected target.

In operation, the antenna 20 of the 3D radar may be scanned continuously in azimuth, either mechanically or electronically, and produces a burst of receive beam echoes of varying intensity as the multiple stacked beams pass through a target, like that shown at 28, for example. The receiving channels 32 function to discriminate between desired echoes from aircraft and other objects similar thereto and undesired interference found in the received echo signalling. The undesired interference may result from such environmental factors as rain, chaff, clutter from ground terrain 38 or slow-moving clouds 40, for example, and pulses from external sources and the like. The function of the 3D computer 36 is to combine the information 34 derived from these multiple receive beam echoes into the best estimate of the target position in three-dimensional space—range R, height H, and azimuth $\theta$.

A more specific example of a present 3D radar is shown by the block diagram schematic embodiment of FIG. 2. Each receive beam echo conditioning channel 1−n may include a receiver R1, R2, ... Rn which is operative to reduce the radio frequency of the receive beam echoes to an intermediate frequency signal IF1, IF2, ... IFn, respectively. Each echo conditioning channel of 32 further includes a target extractor section D1, D2, ... Dn which in each case is coupled to the output of the corresponding receiver to extract target information from the IF signalling generated thereby. Each target extractor section Di may include a constant false alarm rate (CFAR) section and a linear or logarithmic decoding section. The CFAR section conventionally includes a CFAR decoder and detector 50 which provides output signalling 52 to two parallel paths, one including an integrator 54 and a first threshold circuit 56 coupled in cascade therewith and the other path including a second threshold circuit 58.

Generally, the integrator 54 integrates the output signalling 52 over the range sweeps corresponding to an azimuth scan of the radar beam across a target to generate an integrated output signal 60. In the threshold circuit 56, the integrated signal 60 may be compared to a threshold level, which is set above the noise level of the radar, to identify a target condition. Accordingly, the threshold circuits 56 of the multiplicity of echo conditioning channels generate respectively first signals F1, F2, ... Fn which correspond to a time in each range sweep where a target is identified. Similarly, the output signalling 52 of each channel may be additionally compared to another threshold level in the corresponding threshold circuit 58 to generate in each case second signals S1, S2, ... Sn. The generated second signals Si correspond to times in each range sweep where potential targets are identified.

The linear or logarithmic decoding function of a target extracter section Di may include a conventional logarithmic decoder and detector circuit 62 for extracting the amplitude of the IF received beam echo pulses in logarithmic form and generating third signals Ti representative thereof. For the case in which the signal generated by the circuit 62 is in unipolar analog form, the generated signal may be stretched in time by a stretcher circuit 64, say on the order of 0.5 microseconds, for example, to make the timing of the data sample thereof less critical. The first, second and third signals generated from the receive beam echo conditioning channels are exemplary of the information signals 34 which are provided to the 3D computer 36, an embodiment of which being provided by the remaining block diagram schematic of FIG. 2.

Referring to the remaining embodiment, a height measurement extractor comprises the adder and subtracter units 70 and 72 which, respectively, add and subtract pairs of the third signals generated from the multiplicity of receive beam echo conditioning channels to generate corresponding sum and difference signals 74 and 76, respectively. The pairs of third signals operated on by the adder 70 and subtracter 72 correspond to adjacent receive beams of the receive beam elevation stack. An example of this operation may be described in connection with the illustrative sketch of FIG. 3. In this example, echoes from a target X1 are received in the adjacent beams B1 and B2 of the elevation stack. Resulting third signals from the echo conditioning channels corresponding to the beams B1 and B2 are related respectively to the points on the antenna beam patterns designated at 80 and 82, respectively. The resulting third signals may be added in the adder 70 and subtracted in the subtracter 72 to form their sum and difference signals, respectively.

The resulting beam pair sum and difference signals 74 and 76 may be respectively provided to a beam pair select circuit 84 and a multiplexer MUX/analog-to-digital A/D converter circuit 86, respectively. An OR gate 88 may be included in the computer 36 to monitor the multiplicity of echo conditioning channels for the generation of a second signal and to generate a "GO" pulse over signal line 90 in response thereto. The present embodiment achieves this function by coupling each input of the OR gate 88 to a corresponding output of the threshold circuit 58 of each of the decoding sections D1-Dn. A generated "GO" pulse via line 90 renders the beam pair select circuit 84 and MUX/A/D circuit 86 operative during the range sweeps of the radar.

The crossover angles of the receive beams of the radar, denoted as $\phi_1$, $\phi_2$, $\phi_3$ in FIG. 3, for example, are the elevation angles where the adjacent beams have an equal gain. Values representative of these crossover angles of the multiplicity of stacked beams of the radar may be stored in an angle store memory 92. A particular gain or slope, associated with each crossover angle value, may be stored in a slope store memory 94. In a typical operation, the circuit 84 may select a beam pair, generally by determining the largest of the sum signals 74 and generate an address code, representative of the selected beam pair, to be provided to the memories 92 and 94 over signal line 96 and to the circuit 86 over signal line 98. Concurrently, a corresponding beam pair difference signal is selected from the signals 76 by the circuit 86 in accordance with the address code via line 98. The selected difference signal may be digitized in 86 and provided to a height computer 100 utilizing the signal line 102. The sign bit of the digitized signal may be provided to the slope store 94 over signal line 104.

A crossover angle $\phi$ may be accessed from the angle store memory 92 in accordance with the address code 96; and accordingly, an angle slope A may be accessed from the slope store memory 94 in accordance with the address code 96 and polarity bit 104. The accessed signals $\phi$ and A are provided to a height computer 100 for a corresponding height measurement computation performed thereby. A zero range trigger signal and clock pulses generated from an appropriate clock source of the radar may be provided to the height computer 100 over signal line 106. In addition, signals representative of a function of the refraction index of the atmosphere B and the tilt of the antenna $\phi_T$ may also be provided to the height computer 100.

Typically, a target X1 may reflect echo signals which are received by the beams B1 and B2 of the radar as shown by the sketch of FIG. 3. The value associated with the crossover angle $\phi_1$ is accessed from the angle store memory 92 to the height computer 100. The difference signal which may be represented by $\Delta 1$ is applied to the height computer over signal line 102 and the polarity thereof is provided to the slope store memory 94 over signal line 104. From the polarity of the difference signal and the address code of the crossover angle, a slope A is selected from the memory 94 for use in the height computer 100. In the height computer 100, the selected gain factor A scales the difference signal or monopulse error $\Delta$ to obtain the estimate of the target's angular deviation $\Delta\phi$ from the crossover angle $\phi$.

For example, the monopulse difference $\Delta 1$ for the target X1 has a positive polarity resulting in the selection of slope A1 for the computation of the angular deviation $\Delta\phi 1$ (i.e. $\Delta\phi 1 = A1 \cdot \Delta 1$). Similarly, for another target, say X2, for example, the resulting difference signal $\Delta 2$ may be used to access another slope A2 from the memory 94 which is used accordingly to calculate the angle deviation $\Delta\phi 2$ associated therewith.

Accordingly, the height computer 100 computes height estimates for each individual echo corresponding to a generated "GO" pulse over signal line 90 within each range sweep of the radar. An example of an estimated height computation is provided by the following equations:

$$H = R \sin(\phi + \Delta\phi + \phi_T) + BR^2, \quad (1)$$

and $$\Delta\phi = A\Delta, \quad (2)$$

where:
 H = height
 R = range
 $\phi$ = crossover angle of selected beam pair
 $\Delta$ = difference in log data from adjacent beams of selected pair
 A = selected slope parameter, function of selected pair and polarity of $\Delta$
 $\phi_T$ = tilt of antenna
 B = function of index refraction.

The range R for each height computation may be obtained in a number of different ways, one way may be to use a conventional digital counter which is governed by the zero range trigger signal and clock pulses provided to the height computer 100 over signal lines 106. The waveforms 4A-4D illustrate this range computation operation. Each waveform of FIG. 4 is representative an exemplary range sweep of the radar. For example, if a GO pulse is generated in a range sweep as exemplified by the waveform 4A, a height computation will result shortly thereafter represented by the pulse interval of waveform 4B. Should a counter be used for range determination, the clock pulses shown by the waveform of 4C may be used to increment the counter having an output exemplified by the waveform of 4D. At the time of the height computation, the counter output may be sampled to acquire the range R' for use in the instant computation.

For any given target detected by the radar, there may be a succession of range sweeps in which GO pulses are generated, i.e., as the stacked beam passes through the target in azimuth. For each range sweep in which a GO pulse is generated, a range R' and a height H' is generated by the height computer 100 and provided to a height centroider 100 which combines the multiple range R' and height H' computations into a single range and height report, denoted as R and H, respectively. In the instant embodiment, this is accomplished in the height centroider 110 by storing the first N height estimates at the same range received from the height computer 100. Thereafter, each new height report received at the same range causes a comparison to be made between the (N+1) individual reports and the average of the N stored reports; the height report with the largest deviation from the average may be rejected, and the most consistent N may be retained in storage. While this operation minimizes the size of the storage of the centroider 110, at the same time it sacrifices some of the accuracy benefits of the extra estimated height data. For example, if it takes seven range sweeps to pass through a target in azimuth, may be only the information from three range sweeps may be used in the height centroiding process of unit 110. The centroided range R and height H messages are passed to a message associator 120 when no further reports are generated at the same range for M range sweeps.

Concurrent with the foregoing described operations, another OR gate 112 may be used to monitor the multiplicity of echo conditioning channels for the generation of a first signal in the range sweeps and to generate a signal over line 114 in response to that event. The event signals are provided to a conventional range and azimuth centroider 118 along with the zero range trigger and clock pulses via signal lines 116 to generate a range R and azimuth $\theta$ measurement for the detected targets independent of the height extractor operations. The range R and azimuth $\theta$ measurements of the centroider 118 are associated with the range R and height H measurements from the height extractor in the message associator circuit 120 to produce the range, azimuth and height measurements for a detected target. Generally, the association of messages is based on the proximity of times of the message outputs, approximate azimuth, and of their ranges.

While present radars of this variety have operated adequately to perform their desired functions, they perform these functions with a number of drawbacks. Referring to the graph of FIG. 5, in some implementations, the third signals generated by the multiplicity of echo conditioning channels are sampled from range sweep to range sweep at a time which is defined by the leading edge Gi of the generated GO pulse, which varies in time position (e.g. G1, G2, and G3) relative to the center of the target echo pulse as the echo amplitude thereof changes from range sweep to range sweep. With the use of phase discrimination type CFAR processing, this range uncertainty is controlled to within tolerable limits. Thus, the stretcher circuit 64 is capable of spreading the logarithmic signal in time sufficiently to cope with this limited uncertainty. However, amplitude discrimination CFAR processing may create much larger range uncertainty, making the required delay time of the stretcher 64 at times prohibitive.

Another drawback is in the functioning of the message associator 120 wherein the R and H measurements of the height extractor via centroider 110 and the R and $\theta$ measurements of the centroider 118 do not occur simultaneously and thus can occasionally fail to associate. Moreover, if there are two aircraft at nearly the same range and azimuth (or an aircraft and clutter or surface vehicle), the measured heights thereof by the centroider 110 may be incorrectly associated with the range and azimuth measurements of the centroider 118. Still another drawback is encountered under the conditions in which an erroneous height over clutter occurs even when the target aircraft is in a beam with insignificant ground clutter interference. Under these conditions, the beam selection logic of circuit 84 may select the lowest beam pair if its clutter creates a stronger echo signal (i.e., larger pair sum) than the actual target aircraft in a higher beam.

In addition, the monopulse difference pairs for estimating the elevation angle difference are approximated by two straight lines (one for positive data and the other for negative) defined by two slopes for each crossover angle. Because the actual difference curves are not linear, significant erros may be created by the present curve approximation. This error in general is largest in the upper beam pairs where the individual beams are covering a greater elevation extent. It is recognized that the height computations are most accurate when the stacked antenna beam is pointing directly at the target, that is, if the receive beam echoes therefrom do not exceed the dynamic range of the receiver. Here again, because of the varying shapes of the elevation beam patterns, the target echoes received on the sides of the beam patterns from receive beam to receive beam are more likely to be less accurate than those echoes received from the receive beam center because their signal-to-noise ratio is lower and because the monopulse difference curves are generally not identical to those near the beam center. Therefore, height computations involving simple averaging of multiple samples generally fails to provide proper emphasis to the stronger and more accurate receive beams echoes from the target.

Another compromise, which has been described hereabove in connection with the present height centroider 110, is that of the use of only a portion of the selected height computations from the height computer 100 to form the height message. Still further, under the operation of the present radars, a height computation is employed in the computer 100 to compute the height on each interpulse period for target aircraft which may be separated by only a few microseconds in range sweep. This imposes a constraint on the time to perform each height computation, thus forcing the use of a simple height equation (1) with a crude approximation $BR^2$ used to compensate for the effects of atmosphere refraction which may at times introduce significant errors in the resulting height estimation. Refraction effects in this simple equation (1) are approximated by a change to B, equivalent to an effective increase in the earth's radius. Thus, the equation may only assume a constant bending rate at all points in space, and does not take into account the fact that rays at high altitude actually bend less than those at low altitude.

SUMMARY OF THE INVENTION

A radar for detecting a target and computing measurements thereof includes: an antenna assembly for generating a plurality of receive beams stacked in elevation; a transmitter for driving the antenna assembly to transmit radar pulses at a pulse repetition frequency (PRF) and with a desired elevation coverage to illuminate targets within the stacked receive beams, the interpulse periods of the pulse transmissions constituting range sweeps of the radar. The radar is operative to scan the pulse transmissions and associated receive beams in azimuth and to receive echo pulses within the range sweeps as the stacked receive beam scan past objects in the elevation coverage.

In accordance with one aspect of the present invention, the radar includes an echo pulse conditioning channel for each receive beam, each channel comprising: means for sampling the corresponding receive beam signals in accordance with predetermined range intervals during the interpulse periods to generate corresponding range samples of each echo pulse; first means for discriminating between target and non-target range sampled echo pulses to generate a first signal over a range interval corresponding to an identified target echo pulse in a range sweep; range estimation means for selecting a range cell interval of an echo pulse which corresponds to a potential target in a range sweep and for generating a second signal at the selected range cell interval; and second means for extracting the amplitudes from the range sampled echo pulses and for generating third signals representative thereof. Also included is a means for extracting the height of a target identified by the first signals based on a function of the generated first, second and third signals associated therewith.

In one embodiment, the range estimation means determines a range sample of an echo pulse corresponding to the relative peak thereof and generates a second signal at the range cell interval of the determined range sample when the determined range sample of the echo pulse exceeds a predetermined threshold level. In another embodiment, the range estimation means determines a plurality of range samples of an echo pulse disposed about the peak thereof and computes a signal estimating the echo pulse peak based on a function of the determined plurality of range samples. The range estimation means further generates a second signal at a selected range cell interval when the computed signal estimate of the echo pulse peak exceeds a predetermined threshold level.

Moreover, the radar may include means for establishing a set of range sweeps in accordance with the generated first signals and for computing a range measurement of a target identified by the first signals for the established set of range sweeps from the generated first signals thereof. The target height extracting means computes a height measurement of a target identified by the first signals for the established set of range sweeps based on a function of the generated first, second and third signals associated with the identified target and the computed target range measurement thereof.

In accordance with another aspect of the present invention, the target height extracting means may include: means for establishing a set of range sweeps in azimuth in accordance with the generated first signals of an identified target; means for computing a range measurement of the identified target for the established set of range sweeps; means for sampling the generated third signals of the plurality of received beam echo pulse positioning channels at times when a second signal is generated during a first signal target range interval of a range sweep; means for selecting from the plurality of receive beam echo pulse conditioning channels second signals which are generated during a first signal target range interval of a range sweep; and means for computing a height measurement of the identified target for the established set of range sweeps based on factors including the sampled third signals, the selected second signals and the computed range measurement of the identified target of the established set of range sweeps.

The target height measurement computing means may include: means for selecting a pair of sampled third signals corresponding to adjacent receive beams of the stack for each range sweep of the established set as a function of the correspondingly selected second signals and sampled third signals of the range sweeps thereof; and means for computing the target height measurement for the established set of range sweeps as a function of the set of pairs of sampled third signals correspondingly selected therefrom.

In still another aspect of the present invention, the radar may include a computing means for computing a target elevation angle for the commonly identified target of each range sweep of the established set based on a function of correspondingly generated first, second and third signals associated therewith. Each computed elevation angle of the set is weighted and the set of weighted elevation angles are combined to form a composite elevation angle for the range sweep set. A height measurement for the identified target of the established set of range sweeps is computed based on factors including the formed composite elevation angle of the identified target and a computed range measurement thereof.

Still further, the target height extractor may include an elevation angle computing means operative to compute the elevation angle measurement for a detected target. The elevation angle computing means comprises: means for storing a set of elevation angle increments about each elevation angle corresponding to the crossover of an adjacent receive beam pair of the multiplicity of stacked receive beams; means for selecting a pair of third signals generated from the corresponding pair of echo conditioning channels for a range sweep as a function of the first and second signals generated in the range sweep, the selected pair of third signals corresponding to echos from a target received by an adjacent pair of receive beams; means for accessing a pair of elevation angles of an elevation angle increment from the storing means for the range sweep as a first function of the selected pair of third signals; and means for interpolating an elevation angle from between the accessed elevation angles as a second function of the selected pair of third signals, whereby the interpolated elevation angle corresponds to an elevation angle of the target represented by the selected pair of third signals in the range sweep.

In still another embodiment, the range estimation means may include means for determining a pair of successive range samples of an echo pulse straddling the peak thereof, and means for generating a second signal and a range straddle signal based on the determined pair of range samples and a determined threshold level. Accordingly, the height of a target identified by the first signals is extracted based on a function of the generated first, second, third and range straddle signals associated therewith. Moreover, a range stretcher may be included in the first means to compensate the timing of range samples of an echo pulse from a high speed target which moves through a plurality of range cells in the range sweeps of an azimuth scan thereof.

BRIEF DESCRIPTION OF THE DRAWINGS

FIG. 6 is a block diagram schematic of a portion of a radar suitable for embodying the principles of the present invention.

FIG. 8 is a block diagram schematic of an alternate embodiment of an echo conditioning channel suitable for use in the embodiment of FIG. 6.

DESCRIPTION OF THE PREFERRED EMBODIMENT

Figure 1:
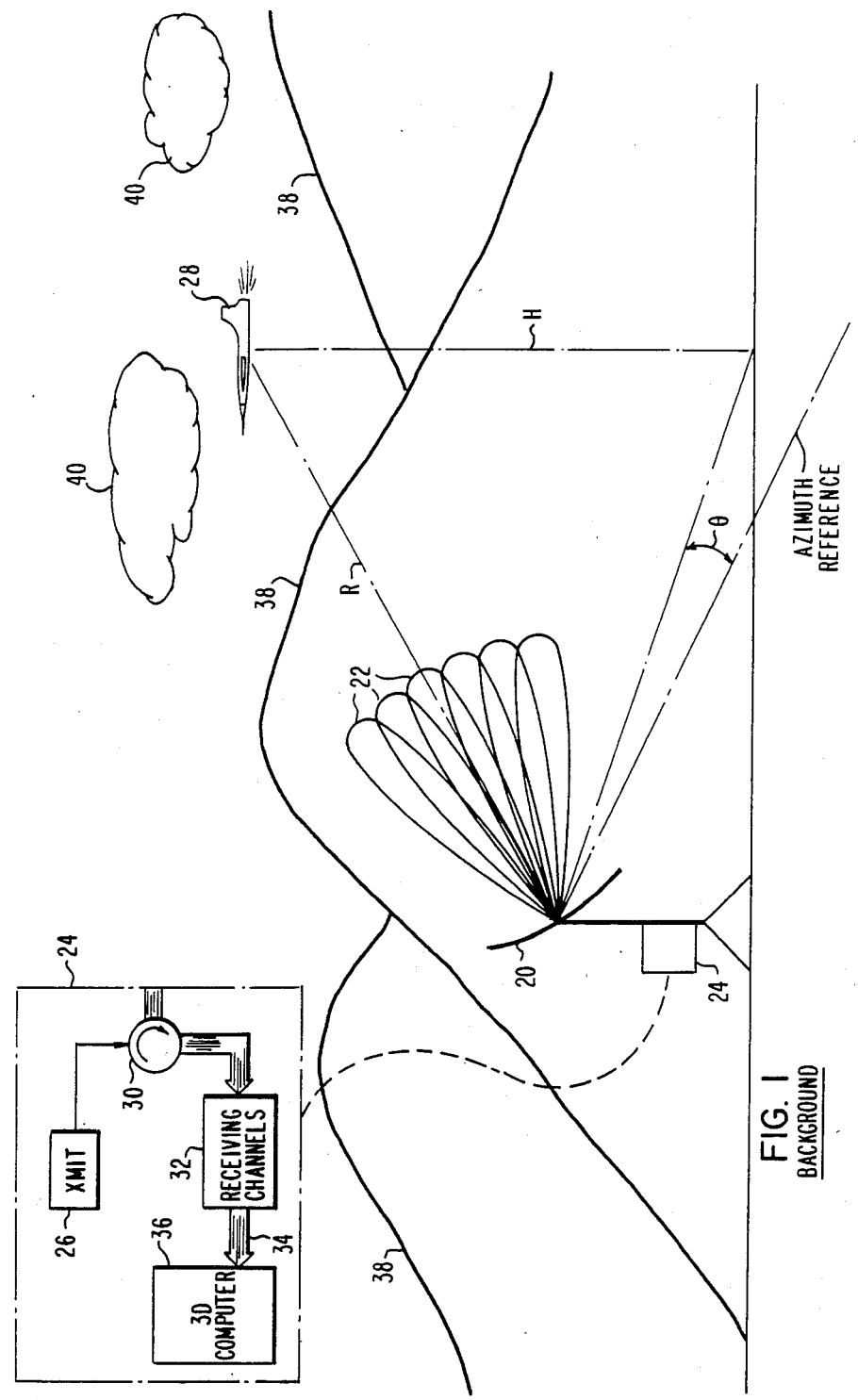
FIG. 1 is an illustrative sketch of a stacked beam radar suitable for embodying the present invention operating in a typical environment.

FIG. 6 depicts a block diagram schematic of a portion of a three-dimensional (3-D) radar suitable for embodying the principles of the present invention. Referring to FIG. 6, each of the receiver units R1 through Rn may include a conventional analog-to-digital (A/D) converter portion for sampling and digitizing its corresponding intermediate frequency signals $IF_1$ through $IF_n$, respectively, in accordance with predetermined range cell intervals for the range sweeps. The resulting range sampled-data IF signals $IF_1'$ through $IF_n'$ are provided to their respective target extraction sections D1 through Dn and coupled to the inputs of both the CFAR and LOG decoders 50 and 62, respectively, for further processing therein.

In accordance with one aspect of the present invention, a range estimator 130 may be disposed in each section D1 through Dn and coupled between the CFAR decoder 50 and integrator 54/threshold 58 functions for operating on the CFAR processed range sampled-data. In the present embodiment, a one range cell delay 131 is additionally included with the range estimator 130 to permit the range estimator 130 to operate on both a present and a previous processed range data sample from the CFAR decoder 50. The one cell delay 131 is provided in the present embodiment to illustrate a simple operation of the range estimator 130 and should not in any way be construed as limiting the range estimation operation to only two range data samples. Rather, the number of range cell delays may be increased to provide the requisite number of range data samples commensurate with the sophistication of the range estimation afforded by the range estimator 130.

Figures 5, 6A:
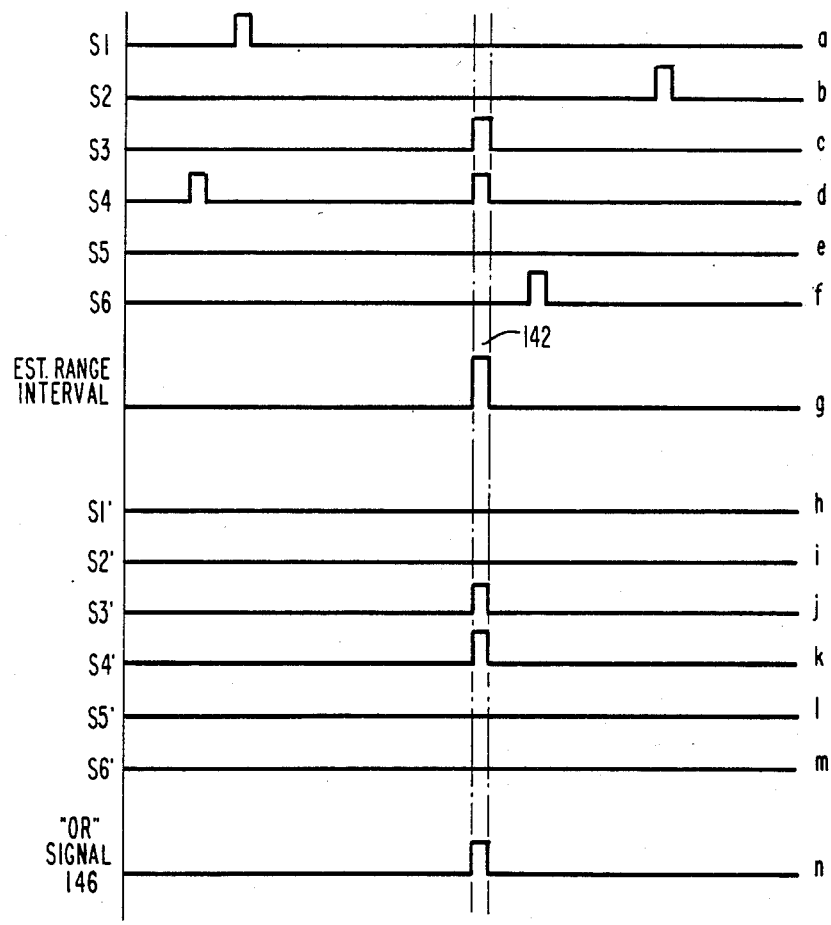
FIG. 5 is a graph exemplifying 3 superimposed waveforms of a target echo pulse of varying amplitude corresponding to 3 respective range sweeps to illustrate the varying time position of the leading edge of each pulse with respect to its amplitude peak.
FIG. 6A includes waveforms a–n which illustrate the operations of selecting and sampling signals of a range sweep for use in the height evaluator of the embodiment of FIG. 6.

The drawback with presently known 3-D radars as described in connection with the graph of FIG. 5 in the Background section hereabove is that the return or echo pulse amplitude of an identified target in a range sweep could be spread across many range cells and generally, only the leading edge range sampled data is used for computation of the height H of the identified target. This range data sample is not the best data to be used for the height computation. To alleviate this drawback, the range estimator 130 along with the one cell delay 131, in each channel D1 through Dn, functions to determine the range samples in each range sweep where relative peaks of an echo pulse occur. Thus, it is these determined data samples from range sweep to range sweep related to a common echo pulse which are passed to the threshold 58 to more closely estimate the range where height data is to be sampled.

In the present embodiment, the range estimator 130 in each section D1 through Dn may evaluate amplitude sampled-data pairs resulting from the CFAR decoder 50 to determine the range samples occurring at relative peaks of the echo pulse and pass the sampled amplitude associated therewith to the threshold 58 for range estimation. For example, for the waveform 7A, the range estimator 130 utilizing the one cell delay 131 may evaluate the pair of amplitude samples at range cells $r_{i-1}$ and $r_i$ and determine that the $r_{i-1}$ sample is not the amplitude closest to the peak. Similarly, range cell samples $r_i$ and $r_{i+1}$ may next be evaluated. During an evaluation, it may be determined that range cell $r_{i+1}$ is a relative peak of the conditioned return pulse and thus, the amplitude sample $a_{i+1}$ corresponding thereto may be passed to the threshold 58 for this range sweep.

Figure 7A:
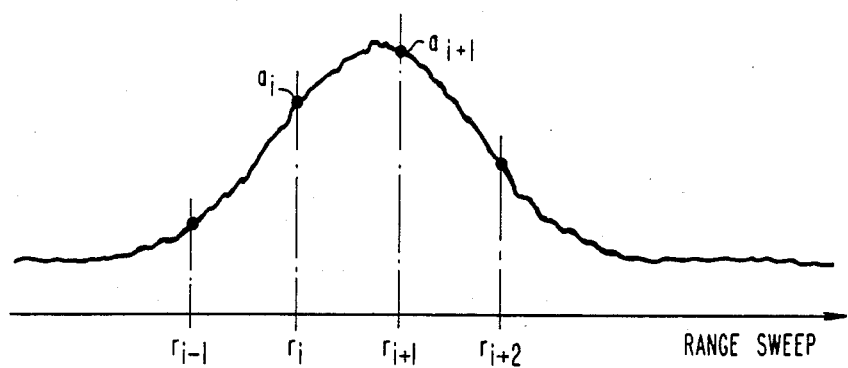
FIGS. 7A, 7B and 7C are graphs exemplifying receiver shaped return pulses spread over common range cells and illustrating the amplitude sampling thereof.
Figure 7B:
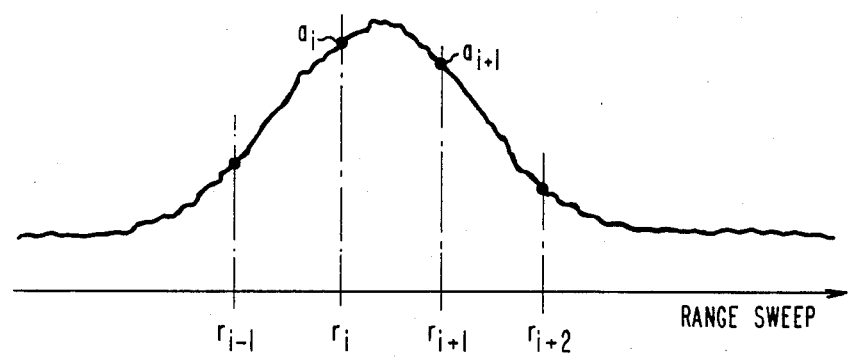

In a subsequent range sweep, as exemplified by the graph of FIG. 7B, the common return pulse is again evaluated by the range estimator 130 and in this example, it is determined that the $r_i$ sample is the closest to a peak and thus the amplitude $a_i'$ corresponding thereto is used for second signal generation because the range cell $r_i$ is considered the best estimate of range for the exemplified pulse. It is understood that not all pulses confronted in a range sweep will rise to the level of a target, but by determining the range cell closest to the peak of a return pulse and passing the corresponding amplitude thereof downstream, the range estimator 130 has improved the height extraction capabilities by increasing the signal-to-noise ratio (S/N) of the sampled-data which is used for height extraction.

Figure 7C:
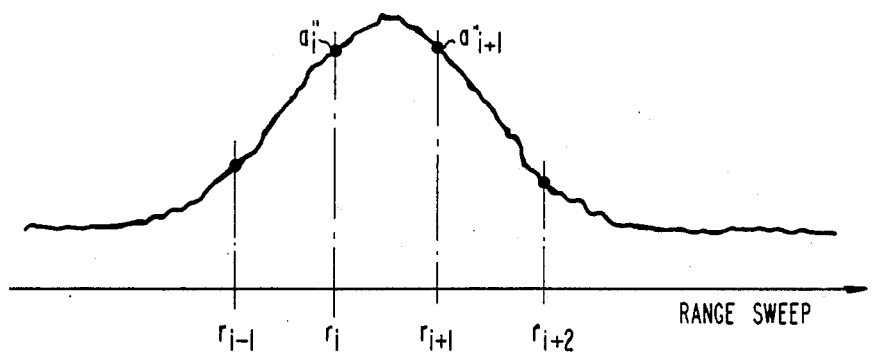

Additionally, the pulse shape of a return signal resulting from the processing of a receiver Ri is generally known a priori based on the filter characteristics of the receiver. Even if the transmitted pulses of the radar are simple rectangular pulses, after being processed by the receiver, the resulting pulses will have a shape, other than flat-topped, which may be gaussian, for example, in accordance with the receiver characteristics. Examples of receiver shaped return pulse waveforms spread over common range cells in different range sweeps are depicted in FIGS. 7A, 7B and 7C. The amplitude sampled data passed by the receiver at range samples $r_{i-1}$, $r_i$, $r_{i+1}$, and $r_{i+2}$, for example, are denoted by the corresponding block dots on the various curves. It is recognized that the sampling in range sweep will very infrequently provide sampled-data at the peak of the echo pulses.

To further improve the S/N ratio of the signal used for target detection, the range estimator 130 may be adapted to estimate the peak amplitude of the pulse of the CFAR decoder output from the sampled pulse amplitudes corresponding to adjacent range cells on either side of the established pulse peak based on its a priori knowledge of the pulse shape. Accordingly, the range estimator 130 may generate a signal representative of this peak estimate which will be used by the aforementioned downstream functions for target detection in its corresponding channel. One example of this function may be described in connection with waveform 7A. The range estimator 130 determines that the peak of the pulse falls between range cells $r_i$ and $r_{i+1}$ and that the range cell $r_{i+1}$ is closest to the peak. Next, the range estimator 130 estimates the amplitude of the pulse peak using the amplitudes $a_i$ and $a_{i+1}$ and generates a signal representative thereof at the range cell $r_{i+1}$ for target detection as hereabove described. One possible method for estimating the peak amplitude may be expressed mathematically by the following equation:

$$\text{peak amplitude estimate} = \sqrt{a_i^2 + K \cdot a_{i-1}^2}, \quad (1)$$

where K is a factor determined from the a priori knowledge of the pulse shape in relation to the amplitudes $a_i$ and $a_{i+1}$.

In summary, the range estimator 130 in each channel determines the range sample closest to the peak of a CFAR conditioned echo pulse spread over a plurality of range cells in a range sweep. In one embodiment, the range estimator 130 passes the amplitude corresponding to the determined range sample to the downstream functions for second signal generation. In another embodiment, the range estimator 130 estimates the peak amplitude of the CFAR conditioned echo pulse and passes a signal representative thereof downstream for target detection and to downstream functions for second signal generation. With the second embodiment, the integrator 54/threshold 56 combination and the threshold 58 of a channel may better detect the presence of a target in a range sweep of its corresponding beam because of the increased S/N ratio of the signal generated by the range estimator 130 and used for the target detection. Additionally, the second embodiment may more closely estimate the range of a detected target because the signal from which the second signal is generated in a range sweep corresponds to the range cell closest to the peak of the CFAR conditioned target echo pulse. Accordingly, when a target is detected by the threshold unit 56 of a channel i, a first signal $F_i$ is generated in the range sweep, and likewise, when a target is detected by the threshold 58 of the channel i, a second signal $S_i$ is generated in the range sweep at the range sample that is closest to the peak of the target.

Continuing with the description of FIG. 6, the OR gate 112 monitors the multiplicity of receive beam echo conditioning channels for an event including the generation of a first signal Fi during a range sweep and generates an event signal over line 114 in response to the event. The event signal is representative of an estimated target range interval of the corresponding range sweep. The event signals or range interval signals via line 114 may be provided to the centroider 118 for establishing a set of range sweeps in azimuth in accordance with a detected target and its range interval. The centroider 118 may generate a signal 134 corresponding to the leading and trailing edges of the established set of range sweeps in an aximuth scan. The signal 134 may be provided to a height evaluator 136 which is operative to compute the height measurement of the corresponding target from height data (i.e., second and third generated signals) which is collected only over the interval designated by the azimuth leading and trailing edges of the signal 134. Each computed target height measurement is thereby automatically associated with the proper target in range, thus eliminating the correlation process performed by the message associator 120 of the embodiment described in connection with FIG. 2. More importantly, the overall height extraction operation is restricted to valid targets which substantially eliminates the possibility of false alarms. In addition, since the height data collection of the second and third signals for a target in each scan is terminated by the azimuth trailing edge of signal 134, the need for a separate end-of-data decision is eliminated.

The centroider 118 is further operative to compute range estimates from the range interval signals and to combine the range estimates from an established set of range sweeps corresponding to a target into range R and azimuth $\theta$ measurements associated therewith. The range measurement R computed for an established set of range sweeps is provided to the height evaluator 136 for use in the computation of a target height measurement for the corresponding set of range sweeps. In the present embodiment, the centroider 118 computes the centroid of the set of estimated range intervals as the target range measurement thereof.

The range interval signal is also coupled commonly over signal line 132 to one input of a multiplicity of AND gates 140. Each of the AND gates of 140 has its other input coupled to a corresponding second signal Si. The multiplicity of AND gates 140 is operative to select from the corresponding multiplicity of receive beam echo conditioning channels those second signals which are generated during an estimated target range interval of a range sweep as governed by the range interval signals over line 132. An example of this operation is shown in the waveforms a through n of FIG. 6A. In this example, it is assumed that there are six receive beam echo conditioning channels and the waveforms $a$–$f$ represent the corresponding second signals generated over a synchronized portion of a range sweep. Waveform g corresponds to an established range interval signal over signal line 132 for the same range sweep portion as that of waveforms $a$–$f$. The resulting waveforms $h$–$m$ correspond to the outputs of the multiplicity of AND gates 140. Note that only second signals S3 and S4 were generated during the estimated target range interval 142 and thus become the selected second signals S3' and S4' for the exemplary range sweep.

An OR gate 144 having its inputs coupled to the corresponding outputs of the multiplicity of AND gates 140 is operative to generate a signal 146 (refer to waveform n of FIG. (6A) at times when a second signal is generated during an estimated target range interval of a range sweep. A multiplicity of switches 148 have their inputs coupled correspondingly to the log decoder and detector circuits 62 of the multiplicity of echo conditioning channels and their outputs 152 coupled to the height evaluator 136. The switches 148 are driven commonly by the signal 146 to sample the generated third signals of the multiplicity of receive beam echo conditioning channels. Both the selected second signals 150 and sampled third signals 152 along with the computed range measurement B are provided to the height evaluator 136 for use in computing a target height measurement for the corresponding established set of range sweeps.

Because the generation of the first signals Fi may be delayed by one or more range sweeps due to the integration operations of the integrator function 54, the estimated range intervals generated over signal lines 132 can cause valid second and third signals, respectively, occurring on previous range sweeps to be disabled. While this is felt not to have a significant impact for most applications, it however may be avoided by delaying the generation of the second and third signals by one or more range sweeps. This optional feature may be implemented in the echo conditioning channels as illustrated by the block diagram schematic of FIG. 8 by including buffer storage memories 154 and 156 at the outputs of the threshold circuit 58 and decoder circuit 62, respectively. The buffer storage memories 154 and 156 are operative to delay their corresponding second and third signals, respectively, for a predetermined delay period, say for example, one range sweep.

The improved timing of the selected and sampled height data in accordance with the aforementioned described apparatus, including the range estimation process of each channel, not only increases the signal-to-noise ratio thereof, but also compensates the timing of samples from high speed aircraft, which move in range during the established set of range sweeps over which the antenna beam is illuminating the determined target.

Figure 9:
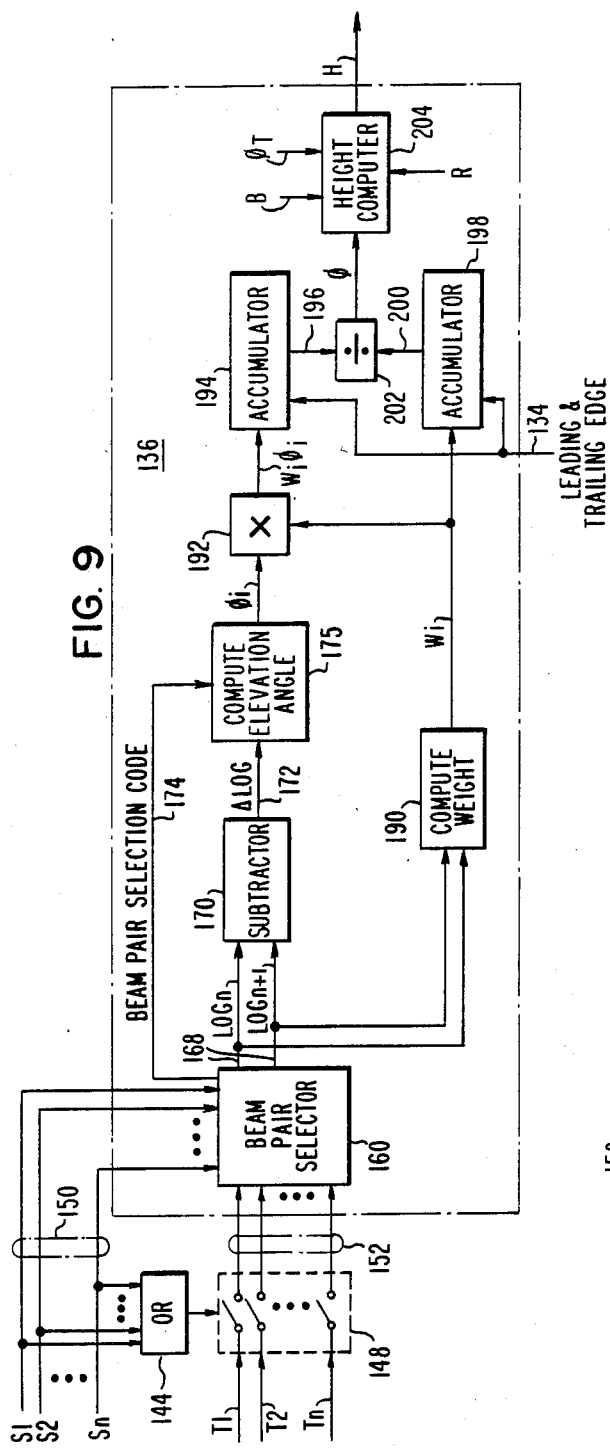
FIG. 9 is a block diagram schematic of a height evaluator suitable for use in the embodiment of FIG. 6.

Various other inventive aspects of the target height evaluator 136 will be described in connection with more specific block diagram schematics of FIGS. 9-12. Referring to FIG. 9, the target height evaluator 136 may include a beam pair selector 160 which is operative to select a pair of sampled third signals from the signals 152 for each range sweep of an established set as a function of the correspondingly selected second signals 150 and sampled third signals 152 of the range sweeps thereof. For the present embodiment, the beam pair selector 160 may include both a discriminating function 162 and an identifying function 164 in cascade therewith as shown in the functional block diagram schematic of FIG. 10. The discriminating function 162 may discriminate the pairs of sampled third signals which correspond to the selected second signals associated therewith for each range sweep. The discriminated pairs 166 may be provided to the identifying function 164 which identifies the discriminated pair of sampled third signals of a range sweep, preferably the pair which has the largest sum, as the selected pair 168 for the range sweep.

The height evaluator 136 also includes a function for computing a target elevation angle $\phi i$ for each range sweep i of the established set based on a function of the selected pair of third signals 168 for the corresponding range sweep i. In the present embodiment, the selected pair of third signals in logarithmic form, denoted as LOGn and LOGn+1, are subtracted from each other in a subtracter 170 to generate a logarithmic difference signal 172, denoted as $\Delta$LOG. In addition, the selector 160 may generate a beam pair selection code 174 corresponding to the selected pair of logarithmic third signals. A corresponding elevation angle $\phi i$ may be computed in a computer function 175 from the signals 172 and 174 for each range sweep of the established set.

Figure 11:
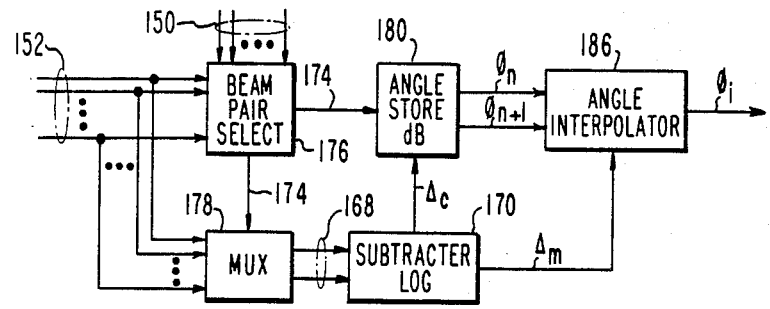
FIG. 11 is a block diagram schematic of the combination of functions including beam pair selection and elevation angle computation suitable for use in the embodiment of FIG. 9.

Referring to the more specific block diagram schematic of FIG. 11, the beam pair selector 160 may include a beam pair select circuit 176 for identifying the beam pair and generating a selection code 174 representative thereof. Also included in the selector 160 may be a multiplexer function (MUX) 178 governed by the selection code 174 to select the pair of third signals from the set of third signals 152. The selected logarithmic signals 168 are subtracted in the subtracter 170 to generate a characteristic difference signal $\Delta_c$ and a mantissa difference signal $\Delta_m$. The elevation angle computer function 175 may include an angle store memory 180 for storing a set of elevation angle increments about each elevation angle corresponding to the crossover of an adjacent receive beam pair of the multiplicity of stacked receive beams.

Figure 13:
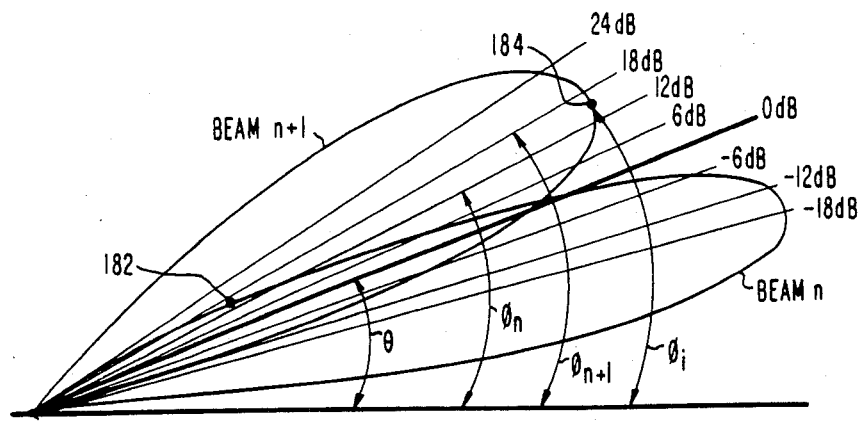
FIG. 13 is a sketch illustrating the elevation angle computational operation of the embodiment depicted in FIG. 11.

An example of the elevation angle increments is shown in the illustration of FIG. 13. Referring to FIG. 13, the angle increments are representative of the monopulse difference curves for the adjacent beams n and n+1. For this example, the angles are incremented in accordance with equal decibel differences, like for example 6 dB, 12 dB, 18 dB, ..., the angle of crossover of the beams n and n+1 being the 0 dB reference level. Assume for example that the selected pair of third signals 168 correspond to the points 182 and 184 of the beam patterns n and n+1, respectively. The selected code 174 forms a portion of the accessing address of the angle store memory 180 referencing the memory to a portion designated for the crossover angle $\theta$. The characteristic difference signal $\Delta_c$ may form another portion of the accessing address for the memory 180 to direct the memory to the appropriate angle increment in relation to the selected crossover angle $\theta$. The combined address of the aforementioned addressing signals permit the accessing of a pair of elevation angles of an elevation angle increment from the storage memory 180 for the corresponding range sweep. In the present example, the pair of elevation angles may be characterized by the following equations:

$$\phi n = \phi(+12 \text{ dB}), \quad (3)$$

$$\phi n+1 = \phi(+18 \text{ dB}). \quad (4)$$

The elevation angle computer function 175 may further include an angle interpolator function 186 for interpolating an elevation angle from between the accessed elevation angles $\phi n$ and $\phi n+1$ using the mantissa difference signal $\Delta_m$ generated by the subtracter 170. For the example illustrated by FIG. 13, the operation of the interpolator 186 may be mathematically expressed as follows:

$$\phi i = \phi n + (\phi n+1 - \phi n)\Delta m. \quad (5)$$

Figure 2:
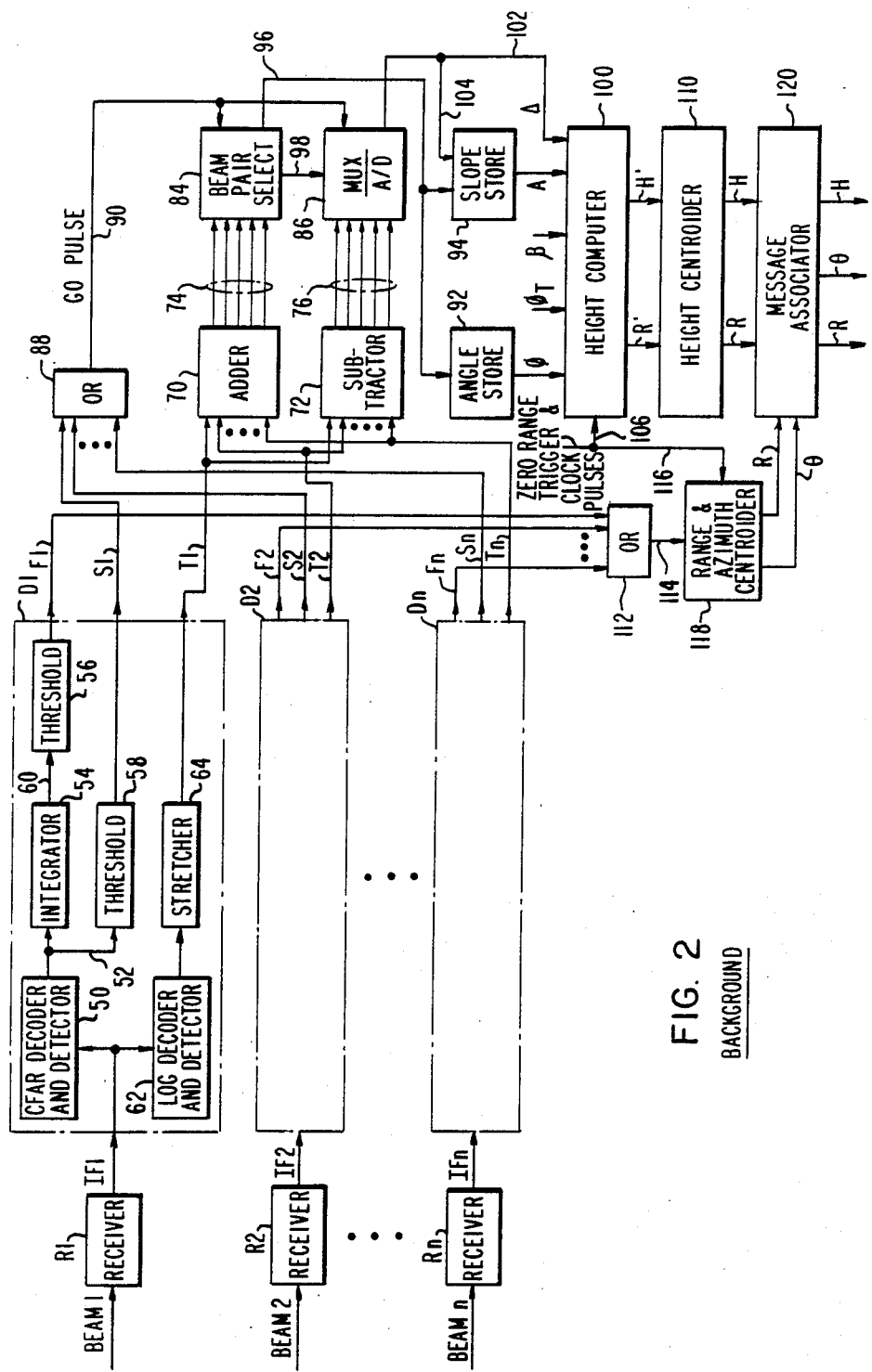
FIG. 2 is a block diagram schematic exemplifying an embodiment of a portion of an existing three-dimensional radar.
Figure 3:
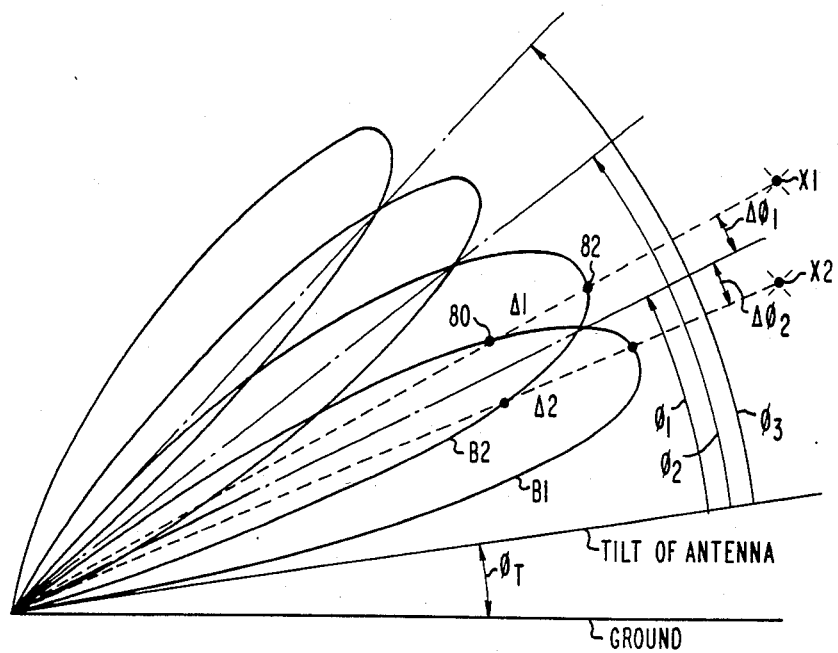
FIG. 3 is a sketch illustrating an elevation angle extraction operation used in the embodiment of FIG. 2.
Figure 4:
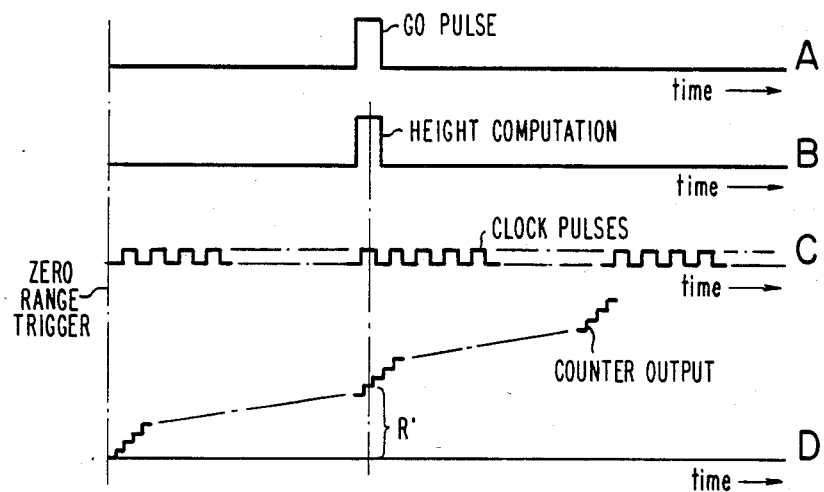
FIG. 4 includes waveforms 4A–4D which depict an operation for range computation suitable for use in the height computer of the embodiment of FIG. 2.

The monopulse difference curves as represented by the angles for equal increments of decibel difference in echo amplitudes, and the use of linear interpolation between the accessed angle samples $\phi n$ and $\phi n+1$ together provide a better approximation to the true difference curves than the two slope method described in connection with the embodiment of FIG. 2. It also provides a method for compromising the interpolation accuracy (i.e., crude multiplication) in exchange for a smaller interpolation interval (i.e., more data points). Because the echo amplitude data is more likely to be in logarithmic digital format, the elevation angles may be conveniently stored in increments represented by the characteristic bits (3 dB or 6 dB). The mantissa data to the right of the characteristic data may be used in the interpolation between the stored angles addressed by the characteristic portion.

The height evaluator 136 further includes a weight computing function 190 for computing an angle weight Wi for each range sweep of the established set and a multiplier 192 for multiplying each computed elevation angle $\phi i$ with its corresponding computed angle weight Wi to form the weighted elevation angle Wi$\phi i$ for each range sweep of the set. Moreover, additional functions are provided for combining the set of weighted elevation angles to form a composite elevation angle $\phi$ for the range sweep set. The particular functions utilized in the present embodiment compute the weighted average of the set of weighted elevation angles of the corresponding range sweep set. More specifically, a first accumulator 194 accumulates the weighted elevation angles for the range sweep set to form a first accumulation signal 196. A second accumulator 198 accumulates the corresponding weights of the weighted elevation angles to form a second accumulation signal 200. Both accumulators 194 and 198 are governed in their operation by the leading and trailing edges of signal 134. The signals 196 and 200 are divided in the divider 202 to form the composite elevation angle $\phi$ associated therewith.

Figure 12:
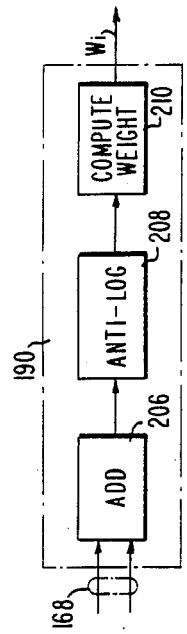
FIG. 12 is a block diagram schematic of an angle weight computational function suitable for use in the height evaluator embodiment of FIG. 9.
Figure 10:
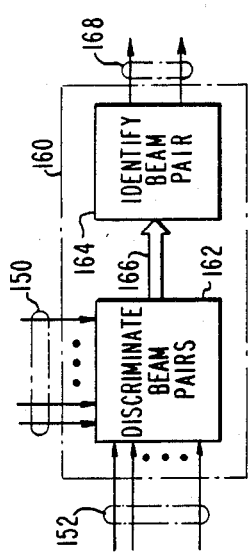
FIG. 10 is a block diagram schematic of a beam pair selector suitable for use in the height evaluator embodiment of FIG. 9.

An embodiment suitable for use as the weight computing function 190 is shown in the functional block diagram schematic of FIG. 12. Referring to FIG. 12, the selected third signals 168 may be added in the block 206. The anti-log of the resulting signal may be computed in the block 208 and the corresponding weight Wi may be computed as a function of the signal anti-log in the block denoted as 210.

The weighted integration of multiple estimates of elevation angles as described in connection with the embodiment of FIG. 9 hereabove provides a greater significance to data from the stronger receive beam echoes. The process involves the generation of a weighting coefficient which is a function of the signal-to-noise ratios of the receive beam echoes in the selected beam pair. The two accumulators 194 and 198 accumulate only between the leading and trailing edges of the signal 134. Accordingly, the extracted elevation angle $\phi$ is the ratio of these two accumulated values. A variety of weighting functions have been evaluated, each providing a more rapid reduction in error as receive beam echo amplitude increases, than an unweighted process. No formulation is sufficiently superior under all conditions; the choice between them is generally based on ease of implementation with a particular hardware configuration. Voltage functions are preferred, because they require fewer bits than power functions.

The extracted elevation angle $\phi$ and corresponding range R for each detected target in the established set of range sweeps are provided to a height computer 204 for the computation of the target height measurement H thereof. It is recognized that this height computation is required only once for each established set of range sweeps for a detected target. In contrast to the height computation methods described in connection with FIG. 2, which computed height on each echo in real time, the computational operations described in connection with FIGS. 6 and 9 are required much less often and can be accomplished leisurely in non-real time.

One benefit derived from the instant computational process is that more sophisticated algorithms may be used to improve accuracy in correction of refraction effects because of the reduction in speed and number of computations. For example, the correction method for refraction effects taught in the U.S. Pat. No. 4,041,491 issued to John W. Taylor, Jr. et al. on Aug. 9, 1977, and assigned to the same assignee as the instant application, may be used in place of the simple $BR^2$ approximation. Significant reduction in height measurement calculation error contributed by refraction may be provided by the aforementioned patented process over that of the effective earth's radius model presently used. However, it is understood that the inventive aspects in this regard are not limited nor restricted to any particular hardware implementation or algorithm for the correction of refraction effects.

An exemplary operation may be described in connection with the illustration of FIG. 1 and embodiments of FIGS. 6-13. As the stacked elevation beams 22 are scanned in azimuth by the radar across a target 28, a receive beam echo will be generated for each range sweep of a succession of range sweeps during the azimuth scan across the target. For the succession of range sweeps associated with the detected target, first, second and third signals will be generated from a number of the echo conditioning channels corresponding to the receive beam echoes. Referring to FIG. 6, the first and second signals are generated in conjunction with the operation of the range estimator 130 disposed in each channel and which estimates a range sample from the CFAR decoder and detector conditioned signals for each range sweep of the set as described hereabove. The OR gate 112 generates an event signal in response to a generated first signal in a range sweep, the event signal being representative of the target range interval in each sweep. The event signals are provided to the centroider 118 and multiplicity of AND gates 140. The centroider 118 computes a range R and azimuth $\theta$ measurement for the set of range sweeps by centroiding the range interval signals provided thereto, for example. The centroider 118 also generates a signal 134 representative of the leading and trailing azimuth edges including the set of range sweeps for which a height computation is effected.

The AND gates 140 select only those second signals generated within the range interval signal for computation in the height evaluator 136. The OR gate 144 detects the presence of a selected second signal and, during the estimated range interval of each range sweep, samples the generated third signals for use in the height computations of 136. A pair of sampled third signals corresponding to adjacent receive beam echoes are selected in the beam pair selector 160 in accordance with the corresponding selected second signal(s) associated therewith. An elevation angle $\phi i$ and associated weight Wi are computed for each selected pair of third signals based on a function thereof. Thereafter, a weighted average ($\Sigma Wi\phi i/\Sigma Wi$) is computed for the set of elevation angles corresponding to the azimuth scan of the detected target 28. A height measurement H is computed only once each set of range sweeps as a function of the elevation angle weighted average and the centroided range among other factors.

Because it is possible to have the peak of a return pulse be positioned anywhere between two range samples, as exemplified by the waveform of FIGS. 7A, 7B and 7C, there may be instances where the return pulse peak is rendered at substantially midway in the interval between the two range samples as exemplified by waveform 7C. This condition is generally referred to as "range straddle". Accordingly, a conflict in determining which range sample to select for target detection may arise in the range estimator 130 under a range straddle condition. Of course, a decision could be made by the range estimator 130 to select arbitrarily one of the two range samples on either side of the pulse peak as the range estimate and use the equation (1) formula for computing the amplitude thereof. But, applicants intend to improve the target detection and range estimation beyond this simple technique to provide better results in detecting a target and computing the measurements thereof. Thus, for this purpose, range straddle detection apparatus may be included in each of the echo conditioning channels D1 through Dn as will be described in greater detail herebelow.

Figure 14:
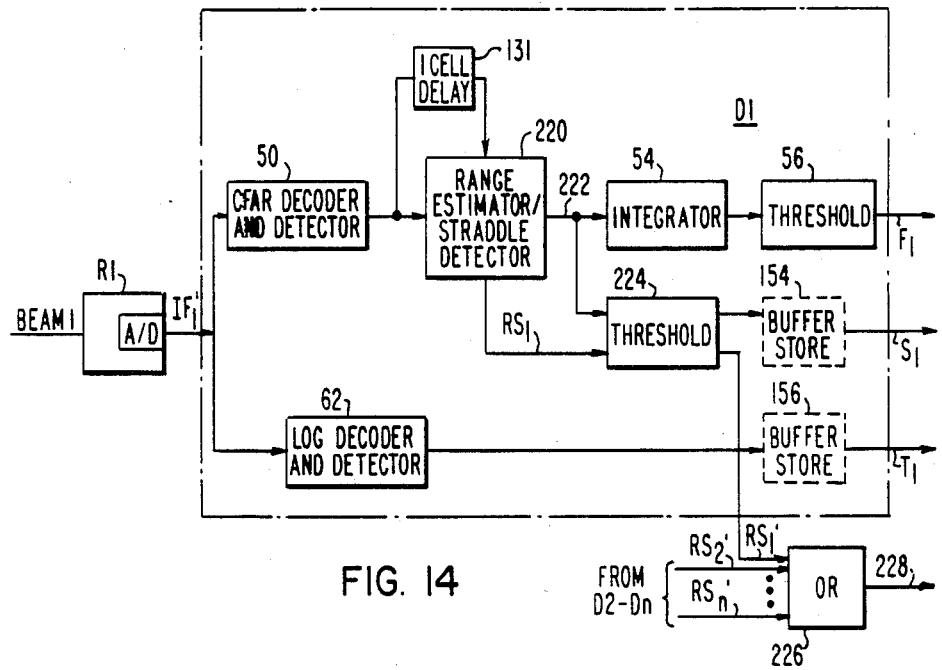
FIG. 14 is a block diagram schematic of a typical echo conditioning channel suitable for embodying a range straddle aspect of the present invention.
Figure 16:
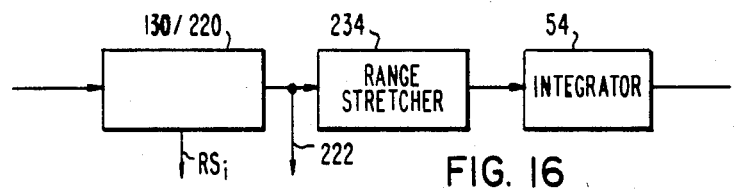
FIG. 16 is a block diagram schematic of a portion of an echo conditioning channel including a range stretcher function to compensate the timing of range samples from high speed targets.

FIG. 14 depicts a block diagram schematic of an echo conditioning channel D1, which is typical of the other conditioning channels D2 through Dn, and suitable for embodying the aspect of range straddle. Many of the elements of the echo conditioning channel D1 depicted in FIG. 14 are similar to those described in connection with the embodiments of FIGS. 6 and 8. A range straddle detection function is included in the range estimator 130 and the combination 220 of the two function replaces the range estimator 130. The new unit 220 is operative to generate a range straddle signal RS1 upon detection of a range straddle condition similar to that exemplified in FIG. 7C. Under this condition, the combination unit 220 is additionally operative to pass the estimated peak signal using data from range samples $r_i$ and $r_{i+1}$ straddling the echo pulse peak via line 222 and the RS1 signal to another threshold function 224 which determines if the estimated signal amplitudes are above the threshold level thereof.

In the event a signal amplitude is determined above the threshold level, the threshold function 224 generates a second signal S1 indicative thereof and passes the range straddle signal RS1' associated therewith to an OR gate function 226. In the present embodiment, the OR gate function 226 monitors all of the threshold functions 224 of the echo conditioning channels D1–Dn for an $RS_i'$ signal. Upon detection of an $RS_i'$ signal from any channel i, the OR gate function 226 generates a signal 228 to enable the height evaluation circuitry downstream to perform separate elevation angle computations for the generated third signals corresponding to the range straddling cells $r_i$ and $r_{i+1}$, for example, from all of the echo conditioning channels as described hereabove in connection with the embodiments of FIGS. 6–12. Consequently, the two elevation angles computed for the range straddling cells in each range sweep may be used to update the weighted average computation of target height H as described in connection with the embodiment of FIG. 9.

Figure 15:
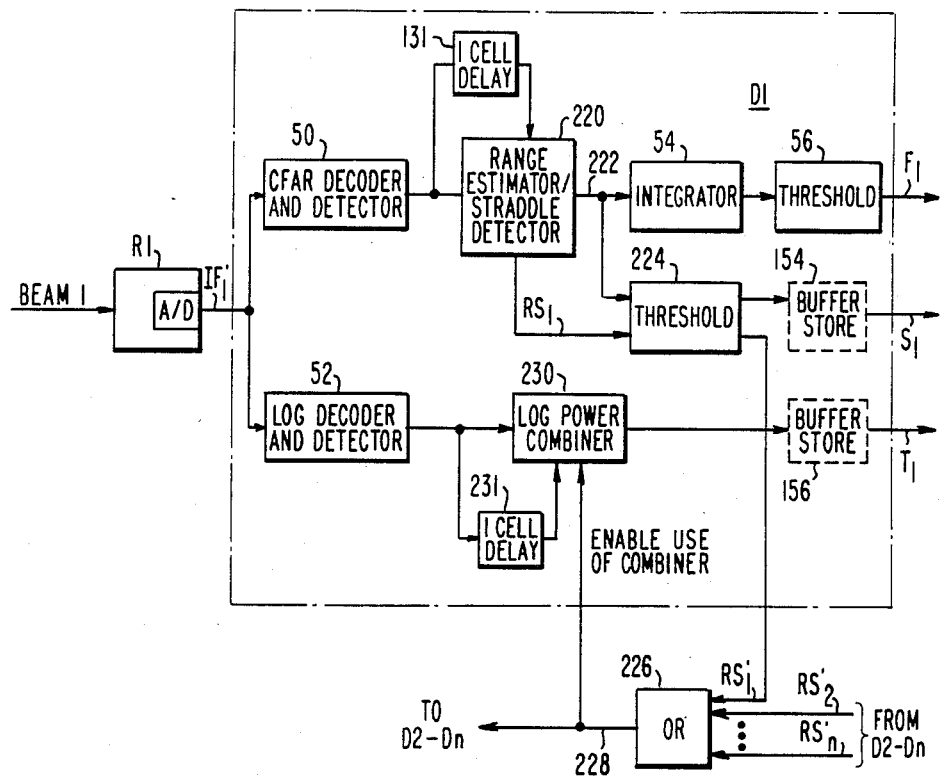
FIG. 15 is a block diagram schematic of an alternate embodiment for the range straddle aspect of the present invention.

FIG. 15 depicts a block diagram schematic of another embodiment of a typical echo conditioning channel adapted to implement the range straddle aspect. Many of the elements of the embodiment of FIG. 15 have been previously described hereabove. A log power combiner 230 along with a one cell delay 231 may be coupled to the output of the log decoder and detector function 62 for combining the output signals of the function 62 corresponding to the range straddling cells $r_i$ and $r_{i+1}$, for example. The OR gate function 226 is operative to detect a range straddle condition $RS_i'$ from any one of the echo conditioning channels and generate a signal 228 which concurrently enables all of the log power combiner functions 230 of the echo conditioning channels D1–Dn to combine in each case the log amplitudes of the two range cells (i.e. present and delayed straddling the peak) to generate, in each case, a third signal which is an estimation of the log amplitude at the estimated target range. This log power combination performed by the function 230 utilizing the cell delay 231 is intended to increase the S/N ratio of the third signals generated thereby for each channel. In addition, under a range straddle condition, only one elevation angle computation using the third signals generated at the estimated target range is needed in each range sweep to update the weighted average computation of target height (see FIG. 9).

One possible method for use by the log power combiner 230 is combining the log amplitudes $a''_i$ and $a''_{i+1}$ straddling the pulse peak may be expressed mathematically by the formula:

$$\text{log power combiner output} = \log \left\{ \sqrt{(a''_i)^2 + (a''_{i+1})^2} \right\} \quad (6)$$

Another aspect of the present invention relates to the inclusion of a range stretcher 234 between the range estimator 130 or combination range estimator/range straddle detector 220 and the integrator 54 in each echo conditioning channel as exemplified in the block diagram schematic of FIG. 15. The range stretcher 234 is operative to compensate the timing of range samples from high speed targets of interest which may move significantly in range during the established set of range sweeps over which the antenna beam is illuminating the target. One embodiment includes the peak selection of the outputs of the function 130 or 220 over the number of range cells a target of interest could move during an integration period of the integrator 54. That is, if a target of interest could move a maximum of three range cells during an integration period, then the signal amplitude input to integrator 54 for say range cell $r_i$, for example, would be peak selected from the stretched range cells $r_{i-1}$, $r_i$, and $r_{i+1}$ by the range stretcher 234. It is understood that this aspect would generally not be utilized for application where targets of interest do not move significantly during the integration period of integrator 54.

What is claimed is:

1. A radar for detecting a target and computing measurements thereof, said radar including: an antenna assembly for generating a plurality of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; an echo pulse conditioning channel for each receive beam, each channel comprising:

means for sampling the corresponding receive beam signals in accordance with predetermined range cell intervals during said interpulse periods to generate corresponding range samples of each echo pulse;

first means for discriminating between target and non-target range sampled echo pulses to generate a first signal over a range interval corresponding to an identified target echo pulse in a range sweep;

range estimation means for selecting a range cell interval of an echo pulse which corresponds to a potential target in a range sweep and for generating a second signal at said selected range cell interval; and second means for extracting the amplitudes from the range sampled echo pulses and for generating third signals representative thereof; and means for extracting the height of a target identified by said first signals based on a function of said generated first, second and third signals associated therewith.

2. A radar in accordance with claim 1 wherein the range estimation means includes:
   means for determining a range sample of an echo pulse corresponding to the relative peak thereof; and
   means for generating a second signal at the range cell interval of the determined range sample when said determined range sample of the echo pulse exceeds a predetermined threshold level.

3. A radar in accordance with claim 1 wherein the range estimation means includes:
   means for determining a plurality of range samples of an echo pulse disposed about the peak thereof and for computing a signal estimating the echo pulse peak based on a function of said determined plurality of range samples; and
   means for generating a second signal at a selected range cell interval when the computed signal estimate of said echo pulse peak exceeds a predetermined threshold level.

4. A radar in accordance with claim 1 wherein the range estimation means includes:
   means for determining a pair of successive range samples $a_i$ and $a_{i+1}$ of an echo pulse straddling the peak thereof and for computing a signal estimating the echo pulse peak in accordance with the following expression:

$$\sqrt{a_i^2 + K * a_{i+1}^2},$$

where K is a factor determined from a priori knowledge of the echo pulse shape in relation to the successive range samples; and
   means for generating a second signal at the range cell interval of the range sample of said pair closest to the peak of said echo pulse when said computed signal estimate exceeds a predetermined threshold level.

5. A radar in accordance with claim 1 including means for establishing a set of range sweeps in accordance with said generated first signals and for computing a range measurement of a target identified by said first signals for said established set of range sweeps from said generated first signals thereof; and wherein said target height extracting means includes means for computing a height measurement of a target identified by said first signals for said established set of range sweeps based on a function of said generated first, second and third signals associated with said identified target and said computed target range measurement thereof.

6. A radar in accordance with claim 5 wherein the establishing means includes:
   means for identifying a succession of range sweeps in azimuth which all include the generation of first signals corresponding to a common identified target as the established set of range sweeps; and
   means for combining the target range intervals identified by the first signals of said established set of range sweeps to compute a target range measurement therefor.

7. A radar in accordance with claim 6 wherein the identifying means comprises an "OR" gate having its inputs coupled correspondingly to the first means of each receive beam echo pulse conditioning channel for monitoring first signal generations.

8. A radar in accordance with claim 6 wherein the combining means includes means for computing the centroid of the set of first signal target range intervals as the target range measurement.

9. A radar is accordance with claim 1 wherein the target height extracting means includes:
   means for establishing a set of range sweeps in azimuth in accordance with said generated first signals of an identified target;
   means for computing a range measurement of said identified target for said established set of range sweeps;
   means for sampling said generated third signals of said plurality of receive beam echo pulse conditioning channels at times when a second signal is generated during a first signal target range interval of a range sweep;
   means for selecting from said plurality of receive beam echo pulse conditioning channels second signals which are generated during a first signal target range interval of a range sweep; and
   means for computing a height measurement of said identified target for said established set of range sweeps based on factors including said sampled third signals, said selected second signals and said computed range measurement of said identified target of said established set of range sweeps.

10. A radar in accordance with claim 9 wherein:
    the selecting means includes a monitoring means coupled to each first means of the echo pulse conditioning channels for generating a target range interval signal corresponding to the generation of a first signal, and a first gating means enabled by said target range interval signal for passing the second signals generated concomitantly therewith to the target height computing means; and
    the sampling means includes a second gating means enabled by a passed second signal for passing the third signals generated concomitantly therewith to the target height computing means.

11. A radar in accordance with claim 9 wherein each first means includes an integrator for integrating signals therein over a predetermined integration period; wherein each range estimation means includes a buffer memory for delaying the generation of the second signals for a first delay period commensurate with said integration period; and wherein each second means includes a buffer memory for delaying the generation of the third signals for a second delay period closely related to said first delay period.

12. A radar in accordance with claim 9 wherein the target height measurement computing means includes:
    means for selecting a pair of sampled third signals corresponding to adjacent receive beams of said stack for each range sweep of the established set as a function of the correspondingly selected second signals and sampled third signals of the range sweeps thereof; and
    means for computing the target height measurement for the established set of range sweeps as a function of said set of pairs of sampled third signals correspondingly selected therefrom.

13. A radar in accordance with claim 12 wherein the pair selecting means includes:

means for discriminating the pairs of sampled adjacent third signals which correspond to the selected second signal associated therewith for each range sweep; and means for identifying the discriminated pair of sampled third signals of a range sweep having the largest sum as the selected pair for the range sweep.

14. A radar for detecting a target and computing measurements thereof, said radar including: an antenna assembly for generating a multiplicity of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; an echo pulse conditioning channel for each receive beam, each channel comprising: first means for discriminating between target and non-target echo pulses to generate a first signal over a range interval in a range sweep corresponding to an identified target echo pulse; second means for generating second signals in each range sweep from corresponding echo pulses which are identified as potential targets; and third means for extracting the amplitudes from the received echo pulses and generating third signals representative thereof; and computing means comprising:

means for establishing a set of range sweeps in azimuth for a common identified target in accordance with said correspondingly generated first signals;

means for computing a target range measurement for said common identified target of said established set of range sweeps;

means for computing a target elevation angle for said commonly identified target of each range sweep of said established set based on a function of said correspondingly generated first, second and third signals associated therewith;

means for weighting each computed elevation angle of said range sweep set;

means for combining said set of weighted elevation angles to form a composite elevation angle for said range sweep set; and means for computing a height measurement for said identified target of said established set of range sweeps based on factors including said formed composite elevation angle and computed target range measurement thereof.

15. A radar in accordance with claim 14 wherein the weighting means includes means for computing an angle weight for each elevation angle of the set; and means for multiplying each computed elevation angle with its correspondingly computed angle weight to form the weighted elevation angle for each range sweep of the set.

16. A radar in accordance with claim 14 including means for selecting a pair of third signals from a corresponding pair of echo conditioning channels for the commonly identified target of each range sweep of the set as a function of the second and third signals correspondingly generated in said range sweeps; and wherein the angle weight computing means includes means for computing the angle weight for each elevation angle of the set as a function of the correspondingly selected pair of third signals.

17. A radar in accordance with claim 16 wherein each third means includes means for extracting the amplitudes from echo pulses corresponding to the commonly identified target and generating third signals representative of a logarithmic form thereof; and wherein the angle weight computing means includes means for combining each selected pair of third signals and computing the corresponding angle weight as a function of said combination.

18. A radar in accordance with claim 14 wherein the combining means includes means for computing the weighted average of the set of weighted elevation angles to form the composite elevation angle of the identified target for the corresponding range sweep set.

19. A radar in accordance with claim 18 wherein the combining means includes: first accumulator means for accumulating the weighted elevation angles for the range sweep set to form a first accumulation signal; second accumulator means for accumulating the corresponding weights of the weighted elevation angles for the range sweep set to form a second accumulation signal; and means for dividing said first accumulation signal with said corresponding second accumulation signal to form the composite elevation angle associated therewith.

20. A radar for detecting a target and computing measurements thereof, said radar including: an antenna assembly for generating a multiplicity of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; an echo pulse conditioning channel for each receive beam, each channel comprising: first means for discriminating between target and non-target echo pulses to generate a first signal over a range interval in a range sweep corresponding to an identified target echo pulse; second means for generating second signals in each range sweep from corresponding echo pulses which are identified as potential targets; and third means for extracting the amplitudes from the received echo pulses and generating third signals representative thereof; and computing means comprising:

means for storing a set of elevation angle increments about each elevation angle corresponding to the crossover of an adjacent receive beam pair of the multiplicity of stacked receive beams;

means for selecting a pair of third signals generated from a corresponding pair of echo conditioning channels for a range sweep as a function of said first and second signals generated in said range sweep, said selected pair of third signals corresponding to echoes from a target received by an adjacent pair of receive beams;

means for accessing a pair of elevation angles of an elevation angle increment from said storing means for said range sweep as a first function of said selected pair of third signals; and means for interpolating an elevation angle from between said accessed elevation angles as a second function of said selected pair of third signals, whereby the interpolated elevation angle corresponds to an elevation angle of the target represented by the selected pair of third signals in said range sweep.

21. A radar in accordance with claim 20 wherein each third means includes means for extracting the amplitudes from received echo pulses and generating third signals representative of a logarithmic form thereof; including means for subtracting the selected pair of logarithmic third signals to generate a characteristic difference signal and a mantissa difference signal; wherein the accessing means includes means for accessing the pair of elevation angles as a function of the corresponding selected pair of third signals and characteristic difference signal generated therefrom; and wherein the interpolating means includes means for interpolating the elevation angle from between the accessed elevation angles as a function of said corresponding mantissa difference signal.

22. A radar for detecting a target and computing measurements thereof, said radar including: an antenna assembly for generating a plurality of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; an echo pulse conditioning channel for each receive beam, each channel comprising:
  means for sampling the corresponding receive beam signals in accordance with predetermined range cell intervals during said interpulse periods to generate corresponding range samples of each echo pulse;
  first means for discriminating between target and non-target range sampled echo pulses to generate a first signal over a range interval corresponding to an identified target echo pulse in a range sweep;
  range estimation means including means for determining a pair of successive range samples of an echo pulse straddling the peak thereof, and means for generating a second signal and a range straddle signal based on the determined pair of range samples and a predetermined threshold level; and
  second means for extracting the amplitudes from the range sampled echo pulses and for generating third signals representative thereof; and
means for extracting the height of a target identified by said first signals based on a function of said generated first, second, third and range straddle signals associated therewith.

23. A radar in accordance with claim 22 wherein the target height extracting means includes:
  means for sampling generated third signals from said multiplicity of receive beam echo pulse conditioning channels, said sampling means being enabled by a range straddling signal to sample from all of said channels the pairs of third signals corresponding to the range cell intervals of said determined pair of successive range samples straddling an echo pulse peak at times when the range interval of said range straddling signal corresponds to a first signal target range interval of a range sweep; and
  means for computing a height measurement of the identified target based on a function of the first signals, second signals, and said sampled pairs of third signals associated therewith.

24. A radar in accordance with claim 22 wherein the second means in each echo pulse conditioning channel includes means, enabled by a range straddling signal, for combining the third signals corresponding to the range cell intervals of said determined pair of successive range samples straddling an echo pulse peak to generate a signal representative of said combination; and wherein the target height extracting means includes means for computing the height of the identified target based on a function of the first signals, second signals and generated combined third signals associated therewith.

25. A radar for detecting a target and computing measurements thereof, said radar including: an antenna assembly for generating a plurality of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; an echo pulse conditioning channel for each receive beam, each channel comprising:
  means for sampling the corresponding receive beam signals in accordance with predetermined range cell intervals during said interpulse periods to generate corresponding range samples of each echo pulse;
  first means for discriminating between target and non-target range sampled echo pulses to generate a first signal over a range interval corresponding to an identified target echo pulse in a range sweep, said first means including a range stretcher to compensate the timing of range samples of an echo pulse from a high speed target which moves through a plurality of range cells in the range sweeps of an azimuth scan thereof;
  range estimation means for selecting a range cell interval of an echo pulse which corresponds to a potential target in a range sweep and for generating a second signal at said selected range cell interval; and
  second means for extracting the amplitudes from the range sampled echo pulses and for generating third signals representative thereof;
and means for extracting the height of a target identified by said first signals based on a function of said generated first, second and third signals associated therewith.

26. In a radar including: an antenna assembly for generating a plurality of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; and an echo pulse conditioning channel for each receive beam, each channel comprising: means for sampling the corresponding receive beam signals in accordance with predetermined range cell intervals during said interpulse periods to generate corresponding range samples of each echo pulse; first means for discriminating between target and non-target range sampled echo pulses to generate a first signal over a range interval corresponding to an identified target echo pulse in a range sweep; and second means for extracting the amplitudes from the range sampled echo pulses and for generating third signals representative thereof, a target height extractor for extracting height measurements of detected targets, said height extractor comprising:

range estimation means for each echo pulse conditioning channel, each range estimation means for selecting a range cell interval of an echo pulse which corresponds to a potential target in a range sweep of its corresponding receive beam and for generating a second signal at said selected range cell interval; and means for extracting the height of a target identified by said first signals based on a function of said generated first, second, and third signals associated therewith.

27. A target height extractor in accordance with claim 26 wherein each range estimation means includes:
means for determining a range sample of an echo pulse corresponding to the relative peak thereof; and
means for generating a second signal at the range cell interval of the determined range sample when said determined range sample of the echo pulse exceeds a predetermined threshold level.

28. A target height extractor in accordance with claim 26 wherein each range estimation means includes:
means for determining a plurality of range samples of an echo pulse disposed about the peak thereof and for computing a signal estimating the echo pulse peak based on a function of said determined plurality of range samples; and
means for generating a second signal at a selected range cell interval when the computed signal estimate of said echo pulse peak exceeds a predetermined threshold level.

29. A target height extractor in accordance with claim 26 wherein each range estimation means includes:
means for determining a pair of successive range samples $a_i$ and $a_{i+1}$ of an echo pulse straddling the peak thereof and for computing a signal estimating the echo pulse peak in accordance with the following expression:

$$\sqrt{a_i^2 + K * a_{i+1}^2},$$

where K is a factor determined from a priori knowledge of the echo pulse shape in relation to the successive range samples; and
means for generating a second signal at the range cell interval of the range sample of said pair closest to the peak of said echo pulse when said computed signal estimate exceeds a predetermined threshold level.

30. A target height extractor in accordance with claim 26 including means for establishing a set of range sweeps in accordance with said generated first signals and for computing a range measurement of a target identified by said first signals for said established set of range sweeps from said generated first signals thereof; and means for computing a height measurement of a target identified by said first signals for said established set of range sweeps based on a function of said generated first, second and third signals associated with said identified target and said computed target range measurement thereof.

31. A target height extractor in accordance with claim 30 wherein the establishing means includes:
means for identifying a succession of range sweeps in azimuth which all include the generation of first signals corresponding to a common identified target as the established set of range sweeps; and
means for combining the target range intervals identified by the first signals of said established set of range sweeps to compute a target range measurement therefor.

32. A target height extractor in accordance with claim 31 wherein the identifying means comprises an "OR" gate having its inputs coupled correspondingly to the first means of each receive beam echo pulse conditioning channel for monitoring first signal generations.

33. A target height extractor in accordance with claim 31 wherein the combining means includes means for computing the centroid of the set of first signal target range intervals as the target range measurement.

34. A target height extractor in accordance with claim 26 wherein the extracting means includes:
means for establishing a set of range sweeps in azimuth in accordance with said generated first signals of an identified target;
means for computing a range measurement of said identified target for said established set of range sweeps;
means for sampling said generated third signals of said plurality of receive beam echo pulse conditioning channels at times when a second signal is generated during a first signal target range interval of a range sweep;
means for selecting from said plurality of receive beam echo pulse conditioning channels second signals which are generated during a first signal target range interval of a range sweep; and
means for computing a height measurement of said identified target for said established set of range sweeps based on factors including said sampled third signals, said selected second signals and said computed range measurement of said identified target of said established set of range sweeps.

35. A target height extractor in accordance with claim 34 wherein:
the selecting means includes a monitoring means coupled to each first means of the echo pulse conditioning channels for generating a target range interval signal corresponding to the generation of a first signal, and a first gating means enabled by said target range interval signal for passing the second signals generated concomitantly therewith to the target height computing means; and
the sampling means includes a second gating means enabled by a passed second signal for passing the third signals generated concomitantly therewith to the target height computing means.

36. A target height extractor in accordance with claim 34 wherein each first means includes an integrator for integrating signals therein over a predetermined integration period; wherein each range estimation means includes a buffer memory for delaying the generation of the second signals for a first delay period commensurate with said integration period; and wherein each second means includes a buffer memory for delaying the generation of the third signals for a second delay period closely related to said first delay period.

37. A target height extractor in accordance with claim 34 wherein the computing means includes:
means for selecting a pair of sampled third signals corresponding to adjacent receive beams of said stack for each range sweep of the established set as a function of the correspondingly selected second signals and sampled third signals of the range sweeps thereof; and
means for computing the target height measurement for the established set of range sweeps as a function of said set of pairs of sampled third signals correspondingly selected therefrom.

38. A target height extractor in accordance with claim 37 wherein the pair selecting means includes:
means for discriminating the pairs of sampled adjacent third signals which correspond to the selected second signal associated therewith for each range sweep; and
means for identifying the discriminated pair of sampled third signals of a range sweep having the largest sum as the selected pair for the range sweep.

39. In a radar including: an antenna assembly for generating a multiplicity of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; and an echo pulse conditioning channel for each receive beam, each channel comprising: first means for discriminating between target and non-target echo pulses to generate a first signal over a range interval in a range sweep corresponding to an identified target echo pulse; second means for generating second signals in each range sweep from corresponding echo pulses which are identified as potential targets; and third means for extracting the amplitudes from the received echo pulses and generating third signals representative thereof, a target height extractor for extracting height measurements of detected targets, said height extractor comprising:
means for establishing a set of range sweeps in azimuth for a common identified target in accordance with said correspondingly generated first signals;
means for computing a target range measurement for said common identified target of said established set of range sweeps;
means for computing a target elevation angle for said commonly identified target of each range sweep of said established set based on a function of said correspondingly generated first, second and third signals associated therewith;
means for weighting each computed elevation angle of said range sweep set;
means for combining said set of weighted elevation angles to form a composite elevation angle for said range sweep set; and
means for computing a height measurement for said identified target of said established set of range sweeps based on factors including said formed composite elevation angle and computed target range measurement thereof.

40. A target height extractor in accordance with claim 39 wherein the weighting means includes means for computing an angle weight for each elevation angle of the set; and means for multiplying each computed elevation angle with its correspondingly computed angle weight to form the weighted elevation angle for each range sweep of the set.

41. A target height extractor in accordance with claim 39 including means for selecting a pair of third signals from a corresponding pair of echo conditioning channels for the commonly identified target of each range sweep of the set as a function of the second and third signals correspondingly generated in said range sweeps; and wherein the angle weight computing means includes means for computing the angle weight for each elevation angle of the set as a function of the correspondingly selected pair of third signals.

42. A target height extractor in accordance with claim 41 wherein each third means includes means for extracting the amplitudes from echo pulses corresponding to the commonly identified target and generating third signals representative of a logarithmic form thereof; and wherein the angle weight computing means includes means for combining each selected pair of third signals and computing the corresponding angle weight as a function of said combination.

43. A target height extractor in accordance with claim 39 wherein the combining means includes means for computing the weighted average of the set of weighted elevation angles to form the composite elevation angle of the identified target for the corresponding range sweep set.

44. A target height extractor in accordance with claim 43 wherein the combining means includes: first accumulator means for accumulating the weighted elevation angles for the range sweep set to form a first accumulation signal; second accumulator means for accumulating the corresponding weights of the weighted elevation angles for the range sweep set to form a second accumulation signal; and means for dividing said first accumulation signal with said corresponding second accumulation signal to form the composite elevation angle associated therewith.

45. In a radar including: an antenna assembly for generating a multiplicity of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked received beams scan past objects in said elevation coverage; and an echo pulse conditioning channel for each receive beam, each channel comprising: first means for discriminating between target and non-target echo pulses to generate a first signal over a range interval in a range sweep corresponding to an identified target echo pulse; second means for generating second signals in each range sweep from corresponding echo pulses which are identified as potential targets; and third means for extracting the amplitudes from the received echo pulses and generating third signals representative thereof, an elevation angle computing means operative to compute the elevation angle measurement for a detected target, said elevation angle computing means comprising:

> means for storing a set of elevation angle increments about each elevation angle corresponding to the crossover of an adjacent receive beam pair of the multiplicity of stacked receive beams;
>
> means for selecting a pair of third signals generated from a corresponding pair of echo conditioning channels for a range sweep as a function of said first and second signals generated in said range sweep, said selected pair of third signals corresponding to echoes from a target received by an adjacent pair of receive beams;
>
> means for accessing a pair of elevation angles of an elevation angle increment from said storing means for said range sweep as a first function of said selected pair of third signals; and
>
> means for interpolating an elevation angle from between said accessed elevation angles as a second function of said selected pair of third signals, whereby the interpolated elevation angle corresponds to an elevation angle of the target represented by the selected pair of third signals in said range sweep.

46. An elevation angle computing means in accordance with claim 45 wherein each third means of the radar includes means for extracting the amplitudes from received echo pulses and generating third signals representative of a logarithmic form thereof; including means for subtracting the selected pair of logarithmic third signals to generate a characteristic difference signal and a mantissa difference signal; wherein the accessing means includes means for accessing the pair of elevation angles as a function of the corresponding selected pair of third signals and characteristic difference signal generated therefrom; and wherein the interpolating means includes means for interpolating the elevation angle from between the accessed elevation angles as a function of said corresponding mantissa difference signal.

47. In a radar including: an antenna assembly for generating a plurality of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; and an echo pulse conditioning channel for each receive beam, each channel comprising: means for sampling the corresponding receive beam signals in accordance with predetermined range cell intervals during said interpulse periods to generate corresponding range samples of each echo pulse; first means for discriminating between target and non-target range sampled echo pulses to generate a first signal over a range interval corresponding to an identified target echo pulse in a range sweep; and second means for extracting the amplitudes from the range sampled echo pulses and for generating third signals representative thereof, a target height extractor for extracting height measurements of detected targets, said height extractor comprising:

> range estimation means for each echo pulse conditioning channel, each range estimation means including means for determining a pair of successive range samples of an echo pulse straddling the peak thereof, and means for generating a second signal and a range straddle signal based on the determined pair of range samples and a predetermined threshold level; and
>
> means for extracting the height of a target identified by said first signals based on a function of said generated first, second, third and range straddle signals associated therewith.

48. A target height extractor in accordance with claim 47 wherein the extracting means includes:

> means for sampling generated third signals from said multiplicity of receive beam echo pulse conditioning channels, said sampling means being enabled by a range straddling signal to sample from all of said channels the pairs of third signals corresponding to the range cell intervals of said determined pair of successive range samples straddling an echo pulse peak at times when the range interval of said range straddling signal corresponds to a first signal target range interval of a range sweep; and
>
> means for computing a height measurement of the identified target based on a function of the first signals, second signals, and said sampled pairs of third signals associated therewith.

49. A target height extractor in accordance with claim 47 including for the second means of each echo pulse conditioning channel, means, enabled by a range straddling signal, for combining the third signals corresponding to the range cell intervals of said determined pair of successive range samples straddling an echo pulse peak to generate a signal representative of said combination; and wherein the extracting means includes means for computing the height of the identified target based on a function of the first signals, second signals and generated combined third signals associated therewith.

50. In a radar including: an antenna assembly for generating a plurality of receive beams stacked in elevation; a transmitter for driving said antenna assembly to transmit radar pulses at a pulse repetition frequency (PRF) and with a desired elevation coverage to illuminate targets within said stacked receive beams, the interpulse periods of said pulsed transmissions constituting range sweeps of said radar, said radar being operative to scan said pulsed transmissions and associated receive beams in azimuth and to receive echo pulses within the range sweeps as said stacked receive beams scan past objects in said elevation coverage; and an echo pulse conditioning channel for each receive beam, each channel comprising: means for sampling the corresponding receive beam signals in accordance with predetermined range cell intervals during said interpulse periods to generate corresponding range samples of each echo pulse; first means for discriminating between target and non-target range sampled echo pulses to generate a first signal over a range interval corresponding to an identified target echo pulse in a range sweep; second means for extracting the amplitudes from the range sampled echo pulses and for generating third signals representative thereof, a target height extractor for extracting height measurements of detected targets, said height extractor comprising:

a range stretcher for each first means to compensate the timing of range samples of an echo pulse from a high speed target which moves through a plurality of range cells in the corresponding receive beam range sweeps of an azimuth scan thereof;

range estimation means for each echo pulse conditioning channel, each range estimation means for selecting a range cell interval of an echo pulse which corresponds to a potential target in a range sweep of its corresponding receive beam and for generating a second signal at said selected range cell interval; and means for extracting the height of a target identified by said first signals based on a function of said generated first, second and third signals associated therewith.

* * * * *